United States Patent [19]

Jurrius et al.

[11] Patent Number: 4,804,432
[45] Date of Patent: Feb. 14, 1989

[54] MANUFACTURE OF GLOVES AND THE LIKE

[75] Inventors: Eran J. P. Jurrius, Barrington, Ill.; Geri A. Russ; Travis A. Russ, both of Laguna Hills, Calif.

[73] Assignee: Bodiguard Technologies, Inc., Buffalo Grove, Ill.

[21] Appl. No.: 16,034

[22] Filed: Feb. 17, 1987

Related U.S. Application Data

[60] Division of Ser. No. 813,970, Dec. 27, 1985, Pat. No. 4,643,791, which is a continuation-in-part of Ser. No. 768,013, Aug. 24, 1985, abandoned.

[51] Int. Cl.$^4$ .............................................. B32B 31/18
[52] U.S. Cl. .................................... 156/350; 156/251; 156/252; 156/256; 156/258; 156/267; 156/285; 156/361; 156/513; 156/515; 2/159; 2/167; 2/169
[58] Field of Search ............... 156/251, 252, 256, 258, 156/267, 287, 361, 350, 351, 443, 459, 470, 471, 513, 549, 198, 204, 217, 227, 474, 515; 53/455, 553, 555, 562; 2/159, 167, 169

[56] References Cited

U.S. PATENT DOCUMENTS

| | | | |
|---|---|---|---|
| 3,028,576 | 4/1962 | Gerard | 156/251 |
| 3,329,548 | 7/1967 | Blatz | 156/251 |
| 3,866,245 | 2/1975 | Sutherland | 156/515 |
| 3,982,978 | 9/1976 | Carpenter | 156/474 |
| 4,034,853 | 7/1977 | Smith | 156/251 |
| 4,108,698 | 8/1978 | Brookshire | 156/227 |
| 4,356,051 | 10/1982 | Moodie et al. | 156/470 |
| 4,522,676 | 6/1985 | Masao | 156/459 |
| 4,555,293 | 11/1985 | French | 156/309.6 |

*Primary Examiner*—Caleb Weston
*Attorney, Agent, or Firm*—Pigott & Gerstman, Ltd.

[57] ABSTRACT

Gloves and other articles are manufactured from a pair of thermoplastic sheets which are drawn along a process line in adjacent, facing relation. A portion of one of the sheets is pushed outwardly to form an outwardly projecting loop, and a thumb-shaped line is formed between adjacent sides of the loop. The loop and adjacent portions of the thermoplastic sheets are then advanced to a finger and hand-forming station, where a thermobonded line of the shape of fingers and hand is formed between the thermoplastic sheets in registry with the thumb-shaped line, while retaining an open wrist portion. One may then cut away the resulting glove at the wrist portion.

11 Claims, 3 Drawing Sheets

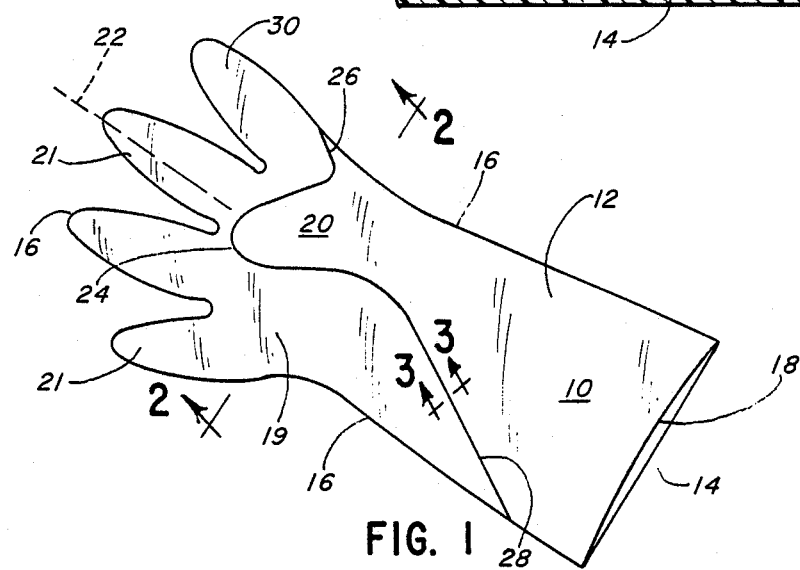
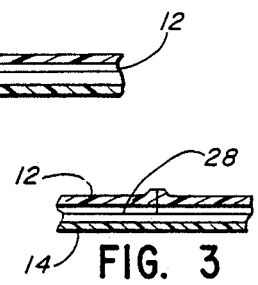
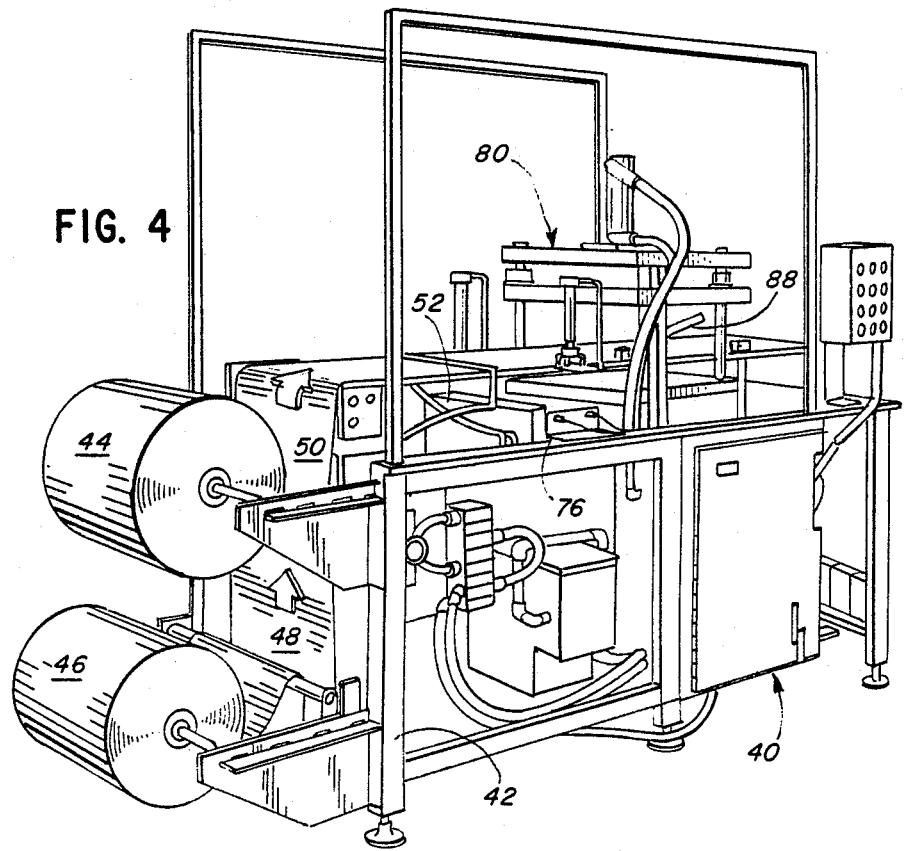

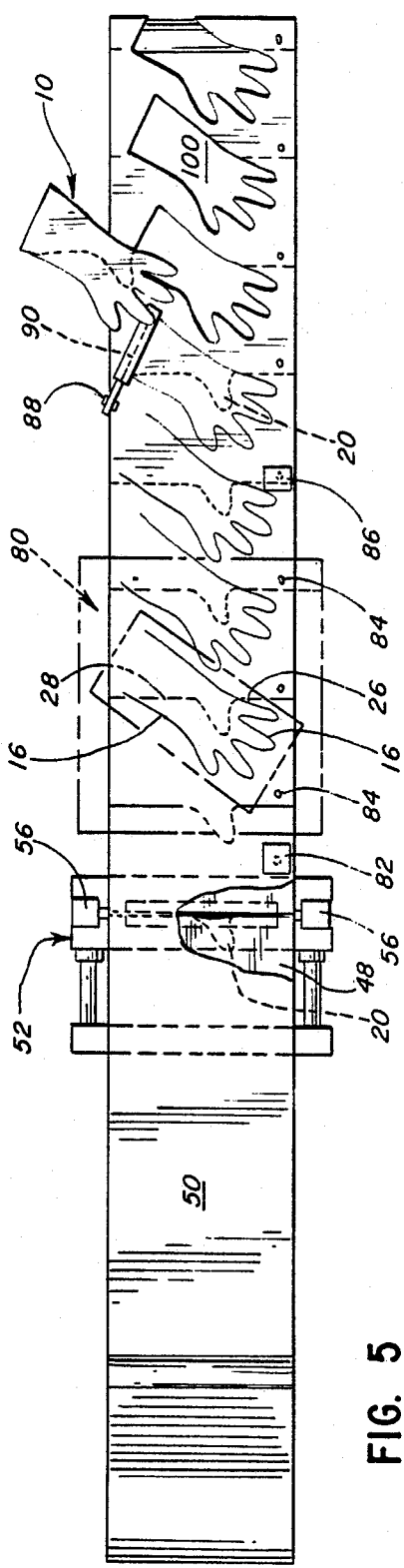
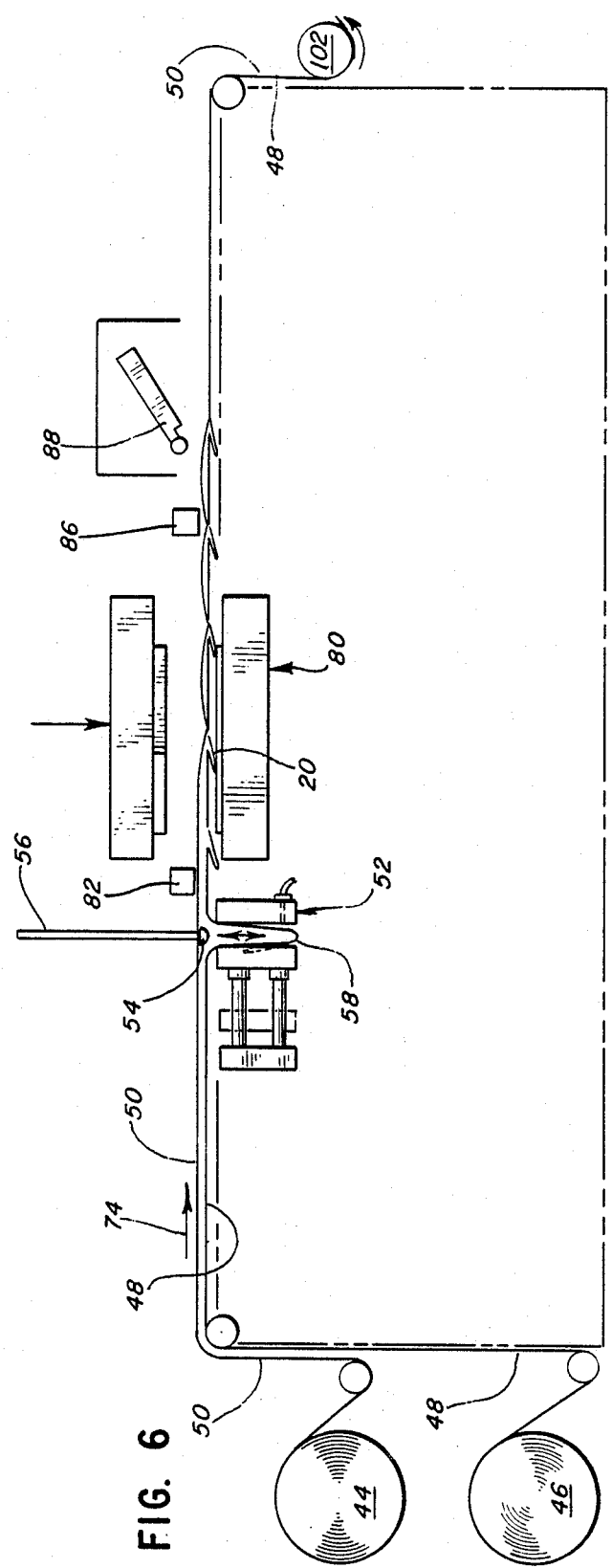
FIG. 5
FIG. 6

MANUFACTURE OF GLOVES AND THE LIKE

CROSS REFERENCE TO RELATED APPLICATION

This is a division of application Ser. No. 813,970, filed Dec. 27, 1985, now U.S. Pat. No. 4,643,791, which is a continuation-in-part of application Ser. No. 768,013, filed Aug. 24, 1985, now abandoned.

BACKGROUND OF THE INVENTION

At the present time most gloves made of plastic or elastomeric materials are made either by dipping a glove form in a dispersion of the plastic to form a thin film of the plastic dispersion on the glove form, or by sewing precut patterns of plastic or non-plastic material together. Additionally, gloves made of some thermoplastic materials may be manufactured from sheets of plastic which are heat sealed rather than sewn together.

However, each of these manufacturing techniques have disadvantageous features. For example, it would be desirable to manufacture gloves from sheets of thermoplastic material such as polyethylene or polypropylene, particularly nonwoven spunbonded microporous material. Many examples of such materials are commercially available for sale; for example, nonwoven spunbonded sheeting sold under the trademark TYVEK by E. I. DuPont de Nemours & Company of Wilmington, Del., and other materials like it. Microporous polytetrafluoreothylene is also available.

Such microporous materials have pores of microscopic size, of a diameter measured only in a few microns or even fractions of a micron. Such porous material would permit a glove to "breathe" for improved comfort of the hand, while at the same time exhibiting resistance to the passage of aqueous fluids through the pores, which are hydrophobic in nature. Accordingly, such gloves would be comfortable for long-term use, since they would permit air circulation through the glove wall while resisting the passage of aqueous solutions.

At the present time, there has been no practical way to manufacture then gloves out of woven or nonwoven spunbonded thermoplastic, or microporous polytetrafluoreothylene materials except, of course, by stitching the glove together, which is impractical. Polyolefin and polyester gloves might conceivably be dip molded, making use of a proper solvent, but due to their lack of resilience, they cannot be effectively removed from the glove form on which they are made without stretch setting or tearing. Similarly, polyolefin film sheeting is heat sealed, and the heat seal often is unacceptably weak.

By this invention, a method and apparatus are provided for the manufacture of gloves, capable of processing woven or nonwoven spunbonded sheeting material (including polytetrafluoroethylene) in a thermobonding process which provided improved gloves. Thus, for the first time it becomes possible to take advantage of available microporous thermoplastic material to manufacture gloves. As a further advantage, since polyolefin thermoplastic material is much less resilient than the latices and polyvinylchloride plastics that have been used in the manufacture of typical plastic or elastic gloves, an improved design of glove is provided by this invention to give an improved hand fit. When a glove is made of polyolefin and polyester material in conventional glove shapes, the effect is unsuccessful. The hand feels the misfit in the glove in a significant way, because these materials are relatively non-resilient and thus strongly resist stretching, contrary to prior art plastic and elastic gloves.

DESCRIPTION OF THE INVENTION

In accordance with this invention, a glove or other article may be made of peripherally thermobonded woven or nonwoven spunbonded polyolefin or other plastic material, preferably having micropores capable of diffusing air therethrough. The glove defines a hand portion, finger portions in relatively diverging relation, and a thumb portion folded against the hand portion in its original, unused condition. the thumb portion extends inwardly across the hand portion at an angle of typically 30° to 60° to the longitudinal axis of the glove.

Typically, a line of thermobonding extends across the front of the glove to each side of the base of the thumb portion, although th base of the thumb portion itself is of course open to the rest of the glove interior. The line of thermobonding may extend from the finger portion corresponding to the index finger diagonally across the front of the glove. This line of thermobonding may be used to advantageously control the circumference of the wrist portion of the glove, resulting in an improved fit. Similarly, the diverging finger portions provide another element of the good fit of the glove of this invention. Undesirable and unpleasant stresses are felt by the hand, when placed in a corresponding glove having parallel finger portions rather than diverging portions as in this invention.

The glove of this invention, or other articles such as gowns, coveralls, or the like, may be manufactured by passing a pair of thermoplastic sheets along a process line in adjacent, facing relation. One pushes a portion of one of the sheets outwardly to form a transversely projecting loop (outwardly projecting for gloves) defining adjacent sides and an outer end. One then forms a thumb-shaped, thermobonded line between adjacent sides of the loop, followed by advancing the loop and adjacent portions of the thermoplastic sheets to a finger and hand-forming station, in the case of a glove. At this station one forms a thermobonded line of the shape of the fingers and hand between the thermoplastic sheets, in registry with the thumb-shaped line, while retaining an open wrist portion.

Thereafter, upon cutting away the resulting glove at the wrist portion, a ready-to-use glove is provided, being made of thermoplastic material.

The axis of the thumb-shaped portion which is formed in the loop, when the thumb-shaped portion is folded back to the plane of the rest of the thermoplastic sheets moving along the process line, may be substantially parallel to such motion along the process line.

Likewise, as the thumb-shaped, thermobonded line is formed, added thermobonded lines extending therefrom are formed essentially perpendicular to the direction of motion along the process line and positioned adjacent the junction of the outwardly projecting loop and the remaining portions of the one thermoplastic sheet from which the loop is formed. These thermobonded lines extending from the thumb-shaped portion are the same as the line of thermobonding extending across the front of the glove as described previously.

The axis of the glove formed on the sheets preferably defines an angle of about 30° to 60° to the direction of motion along the process line.

The palm portion defined in the glove may be sufficiently loose when the glove is worn, to flex. As a result of this, air is circulated through the glove wall for increased hand comfort. Unlike conventional rubber or latex gloves, the fit of the glove of this invention is relatively loose on the hand, with glove material bulging loosely away from the hand surface. For this reason, relatively non-resilient thermoplastics may be used with advantage in this invention.

In the manufacturing process, holes may be punched in the thermoplastic sheets in predetermined, spatial relation to each thumb-shaped line. Sensing means are provided to position the holes and sheets upon said advancing of each loop to the finger and hand-forming station, to cause proper registry of the respective thermobonded, thumb-shaped line and finger and hand line. Other mechanisms such as slides, sprockets, caterpillars, and rollers may be used to cause proper registry of the thumb-shaped line and finger and hand line.

Portions of the sheets outside of the thermobonded lines may be stripped away, leaving the formed glove.

The thumb-shaped line is formed by first die means, which typically open and close in a longitudinal direction relative to direction of motion of the sheet apart from said loop. Suction port means may be provided to retain the loop in position in the first die means during formation of the thumb-shaped, thermobonded line. It is also typically desirable for portions of the loop outside of the thumb-shaped, thermobonded line to be severed away by the first die means as the thumb-shaped line is formed, i. e. by action of a cutter ridge in the first die means to cut the outside portions away. The suction port, which retains the loop in position in the first die means, may then reverse its function and blow pressurized air from the suction port means, to push away the excess, cutaway loop portions. At the same time, rotatable fingers in the first die means may push away the severed portions to automatically prepare th first die means for recycling. The thermoplastic sheets are then advanced, which causes the thumb-shaped, thermobonded portion to be drawn out of the first die means. thermoplastic sheets by second die means. Contrary to the first die means, the second die means may open and close in a direction normal to the plane of the sheets apart from the loop.

Additionally, pockets may be formed in clothing articles or the like by pushing the transversely projecting loop inwardly between the thermoplastic sheets rather than outwardly, followed by appropriate heat sealing at a later station. Pleats in gowns, pants, or other clothing may be formed in similar manner. Thus, by this invention, garments for hospital or industrial use, for example, may be manufactured.

DESCRIPTION OF THE DRAWINGS

In the drawings, FIG. 1 is a persepective view of a glove manufactured in accordance with this invention;

FIG. 2 is a section taken along line 2—2 of FIG. 1;

FIG. 3 is a section taken along line 3—3 of FIG. 1;

FIG. 4 is a persepective view of a machine for manufacturing gloves in accordance with this invention;

FIG. 5 is a plan view, with parts removed, of the process line used for manufacturing gloves in the machine of FIG. 4;

FIG. 6 is an elevational view, with parts removed, showing the basic operation of the machine of FIG. 4;

DESCRIPTION OF SPECIFIC EMBODIMENT

Figure 7:
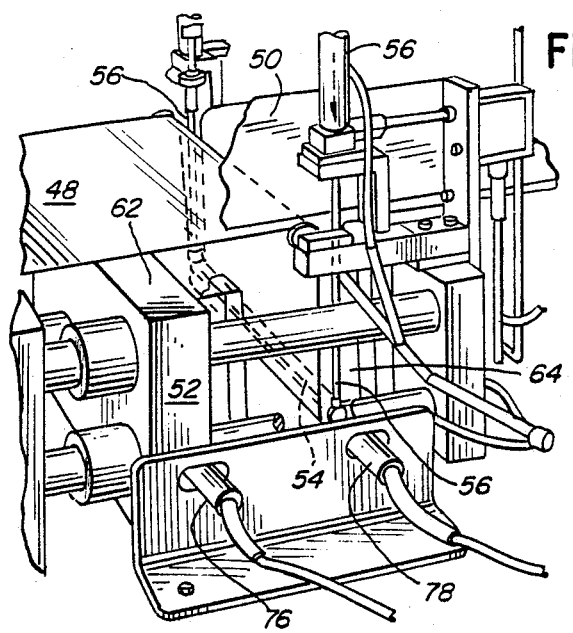
FIG. 7. is a fragmentary perspective view of the first die means used in the machine of FIG. 4 and nearby parts, the first die means shown in open position.
Figure 8:
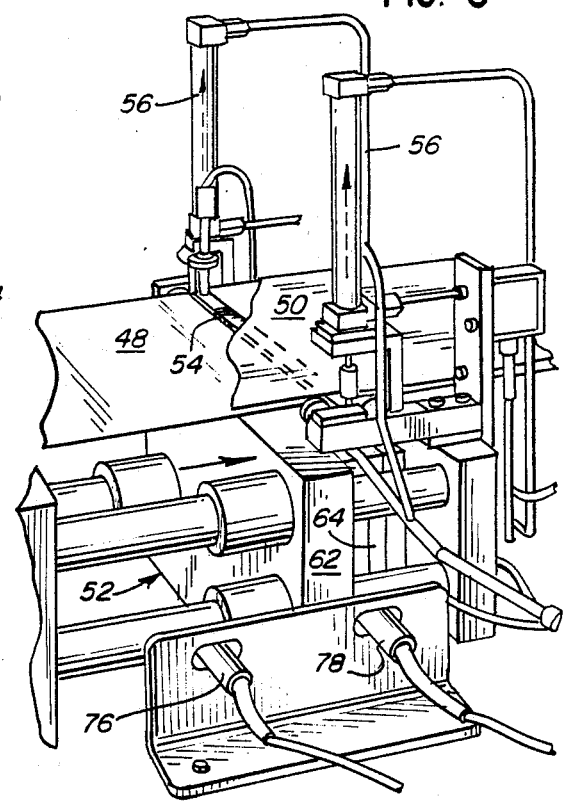
FIG. 8 is a perspective view similar to FIG. 7 but showig the first die means in closed position.
Figure 10:
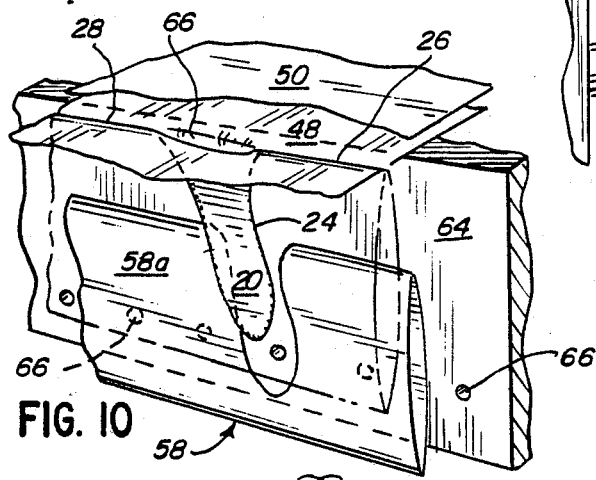
FIG. 10 is a fragmentary perspective view of one half of the first die means, showing scrap material of the loop being separated from the newly formed thumb portion.

Referring to the drawings, FIG. 1 shows a glove made of thermoplastic sheeting having micropores capable of diffusing air therethrough. The thermoplastic sheeting may be the previously described TYVEK sheeting or porous polytetrafluorethylene sheeting, or any other desired thermoplastic material.

Glove 10 comprises a pair of facing sheets, front sheet 12 and back sheet 14, which are sealed together by a peripheral seal line 16 extending entirely around the periphery of glove 10 except for an open aperture 18 at the end of the wrist portion of the glove for hand access.

The glove 10 defines a hand and finger portion 19, in which individual fingers 21 are formed in slightly diverging configuration, each finger being of an angle on the order of typically about 10° or 15° from adjacent fingers. This improves the fit of the glove, and is particularly important when polyolefin sheeting or other relatively non-resilient material is used, to avoid feelings of misfit by the hand within the glove.

Thumb portion 20 extends in its original, unused condition inwardly across hand portion 19 at an angle most preferably of about 30° to 60° to the longitudinal axis 22 of the glove (preferably about 45°) and typically resting against hand portion 19. This configuration helps to provide improved fit, opening up the possibility of using relatively non-resilient materials such as polyolefin plastic sheets in manufacture of the glove.

The periphery of thumb portion 20 is defined by a line of thermobonding 24, although thumb portion 20 is of course open at its bottom as shown for thumb access. On each side of the base of thumb portion 20 additional lines of thermobonding 26, 28 extend from the finger portion 30, corresponding to the index finger, diagonally across the front of glove 10 as shown. These lines of thermobonding 26, 28 are formed only in front sheet 12 and not in back sheet 14, so that the entire space between sheets 12, 14 is opened and unsealed for hand access. Lines of thermobonding 26, 28 may be used to help control the fit of the glove particularly around the wrist by controlling the "blousiness" or outward bulging of the wrist area of glove 10 in a manner improved over lines of thermobonding positioned elsewhere and in other directions on the glove.

Specific grades of Du Pont TYVEK that have been found particularly advantageous for manufacture of the glove of this invention include grades 1444, 1422, 1443, and 1445.

The lines of thermobonding utilized in the glove of this invention may be made in accordance with the method and with apparatus as disclosed in the allowed patent application of Robert C. French, Ser. No. 517,824, filed July 26, 1983, and entitled "METHOD AND APPARATUS FOR THERMOBONDING SEAMS IN THERMOPLASTIC MATERIAL".

The method and apparatus for manufacturing gloves in accordance with this invention is as shown in FIGS. 4 through 12. In FIG. 4, glove manufacturing apparatus 40 defines a frame 42 which carries a pair of rolls 44, 46 of thermoplastic sheeting, typically nonwoven spunbonded polyolefin sheeting such as TYVEK sheeting or the like. The individual layers of sheeting 48, 50 are advanced along the process line of apparatus 40 in adjacent, facing relation, as shown for example in FIGS. 6, 7, and 8, to first die means 52. At this station, horizontal rod 54, operated by hydraulic or pneumatic cylinders 56 at each end thereof, is positioned between thermoplastic sheeting 48, 50. Thus rod 54 may be driven downwardly, forcing a segment of sheeting 48 (but not sheeting 50) into the form of a loop 58, which projects outwardly and defines adjacent sides and an outer end 60. See particularly FIG. 9a. In further operation of the apparatus, horizontal rod 54 then withdraws, as in FIG. 9a, and the two halves 62, 64 of first die means 52 are brought together as in FIGS. 8 and 9b with loop 58 between them to form thermobonded lines 24, 26, 28, which will eventually be found on glove 10 as shown in FIG. 1.

Thermobonded lines 26, 28 are formed essentially perpendicular to the direction of motion along the process line; see particularly FIG. 12. Thermobonded lines 26, 28 close the top of projecting loop 58 (FIG. 11) which was formed by the horizontal rod 54. At the same time, cutter members in die halves 62, 64 sever away the remaining portion 58a of loop 58 which is outside of the newly formed thumb portion 20, so that member 58a may drop away, leaving the projecting thumb portion 20 depending from the resealed length of sheeting 48. Aperture 66 is thus formed between thermobonding lines 26, 28, permitting ultimate thumb access into thumb portion 20.

Figure 9A:
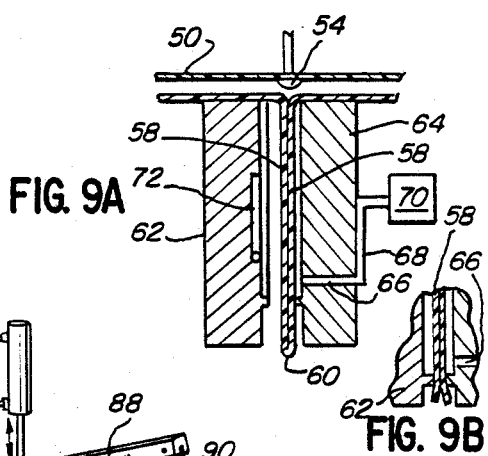
FIG. 9a is a detailed longitudinal sectional view of the first die means and related parts in open position.
Figure 9B:
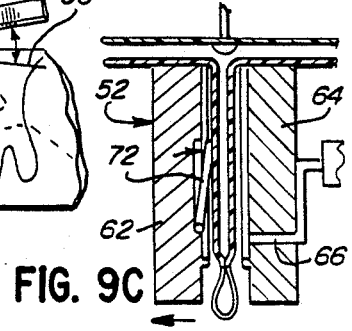
FIG. 9b is a fragmentary longitudinal sectional view of the first die means in closed position.

As shown in FIG. 9a, a plurality of apertures 66 in die half 64 are provided, with a conduit 68 communicating with pneumatic control 70. Loop 58 is driven downwardly into the position shown in FIG. 9a by horizontal rod 54, and rod 54 is then withdrawn. Control unit 70 causes a suction to take place through apertures 66 to cause loop 58 to be retained in position against die half 64. This prevents loop 58 from being withdrawn or wrinkled as horizontal rod 54 is withdrawn, and may be particularly desirable if there is a small amount of back tension on rollers 44, 46 which could create a certain amount of force biasing the sheeting 48 to spring back along the process line. Thus, when first die means 52 closes, it closes on a properly positioned loop 58.

Figure 11:
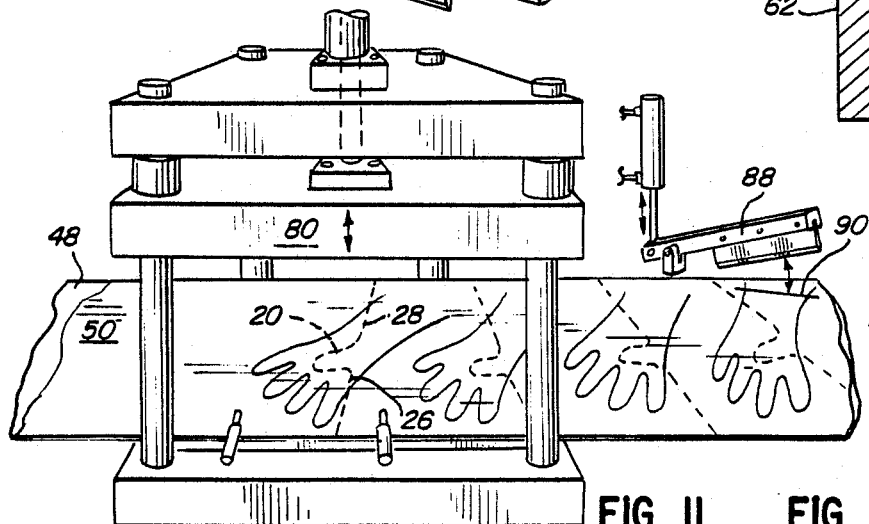
FIG. 11 is a perspective view of the second die means of this invention and cutter means found in the apparatus of FIG. 4.
Figure 9C:
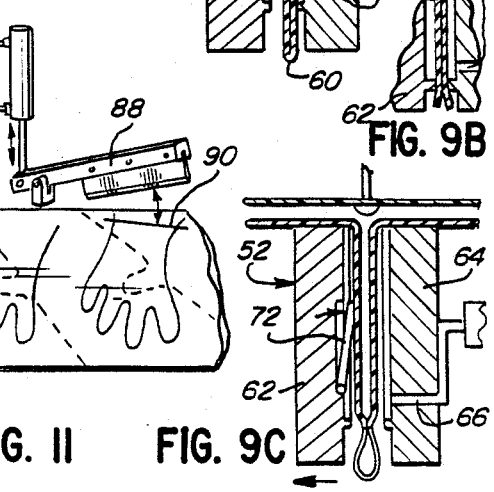
FIG. 9c is a fragmentary longitudinal sectional view of the first die means in reopened position when the newly formed thumb portion is ready for removal.

When first die means 52 reopens, as shown in FIG. 9c, apertures 66 receive pressurized air from control unit 70 which blow against loop 58 to cause it to disengage from die half 64. At the same time, recessed, rotatable spring arms 72 are positioned to rotate outwardly from die half 62 to force disengagement of loop 58 from the surface of that die half as well. As the die halves open, waste portion 58a then falls out of the die, as shown in FIG. 11, and the continuing moving of the process line causes the newly formed thumb portion 20 to be drawn out of first die member 52 to lie on the underside of sheets 48, 50 as shown in FIG. 6. The shorter thumb portions 20 may be contrasted with the larger loop 58, which has just been placed into first die member 52 as shown in FIG. 6. It can also be seen that first die member 52 may be controlled by pneumatic or hydraulic means 72 to open and close in a horizontal manner, i. e. generally parallel to the direction of motion 74 of the process line.

Sensors may be present to assure proper operation of the thumb-forming station. The sensors may be for example magnetic sensors so that the proximity of the appropriate part can cause an electrical signal to be sent through a micriprocessor, to cause a next step of the machine operation to take place. Thus, in the absence of such a signal, a machine malfunction may have taken place and operation of the machine is automatically stopped. For example, sensors 76, 78 sense the position of platen 62 of the first die means, so that the machine will not proceed to self-destruction in case the platen fails to retract for any reason. Another, similar sensor can be used to sense the position of horizontal or tucker rod 54 to avoid damage upon malfunction.

The pair of facing thermoplastic sheets 48, 50 moves from first die member 52 to second die member 80. Puncture member 82 (FIGS. 5 and 6) is adapted in conventional manner to punch a hole 84 which is in predetermined spatial relation with each newly formed thumb shaped line 24. Accordingly, as the sheeting 48, 50 passes down the process line, sensor member 86 is positioned to detect each hole 84, and to send a signal to stop the sheeting, with each thumb 20 in exactly the right spatial position within second die means 80. Thus, the hand and finger portion to be impressed by die 80 into sheeting is correctly positioned with respect to each thumb portion 20. Second die member 80 then closes, to form peripheral line 16 of glove 10 between sheeting 48, 50, and across previously formed thermobonding lines 26, 28. Thus, glove 10 is formed between sheeting 48, 50 but still connected thereto at the end of the wrist portion.

As the sheeting advances down the process line once again, it passes under cutting member 88 which is positioned diagonally of the axis of sheeting 48, 50, to provide a cutting line 90 through the sheets as shown in FIG. 5, causing the completed glove 10 to be separated from the sheeting, and leaving a glove-shaped aperture 100 in the remainder of the sheeting. The scrap sheeting 48, 50 may then be wound on a powered roller 102 as shown in FIG. 6, which advances the sheeting 48, 50 through the entire process line.

The various functions of the apparatus and method of this application may be correlated and controlled in the manner of conventional processing machinery, desirably making use of microprocessor controls.

Typically, both the first and second die means may form the respective desired lines of thermobonding by the use of a heated steel ridge on one half of the die which rests in a slot of similar shape on the surface of the other part of the die, which surface is made of polytetrafluoroethylene, or other suitable material.

It may be noted from FIGS. 5 and 6, for example, that the axis of thumb portion 20, when folded back to essentially the plane of the thermoplastic sheets 48, 50 moving along the process line, is substantially parallel to the motion along the process line. Similarly, it can be seen that the axis of each glove 10 formed thereon defines an acute angle to the direction of motion along the process line.

It can also be seen that the direction of opening and closing the second die means 80 is perpendicular to the direction of opening and closing of first die means 52.

Thus, by the method and apparatus of this invention, gloves may be formed from a pair of overlying layers of thermoplastic sheeting. The specific design of the gloves disclosed herein has significant advantage in the manufacture of polyolefin gloves, or any other glove which has low resilience, in the combination of the thumb placement, the fingers diverging at an angle approximating that illustrated, and the placement of the thermobonded lines 26, 28 to provide a good fit to the hand so that the low resilience of a glove material does not bother the user. Typically, the palm portion in the glove design of this invention will be loose enough to flex and move back and forth away from the hand as the glove is worn, which in the case of microporous materials will increase air exchange through the glove wall to carry away moisture from sweat and the like.

The gloves of this invention may be bacteria blocking, and also may block toxic materials and the like to protect the hands. Since no stitching is used, but instead, solid, thermobonded lines hold the gloves together, the barrier characteristics of the gloves will be substantially a function of the barrier characteristics of the material from which they are made.

Typically, right hand and left hand gloves are manufactured in separate runs through the apparatus of this invention by changing the particular first and second die means in an appropriate manner. However, if desired, pairs of first die means and pairs of second die means may be present in the apparatus to operate sequentially, so that the gloves of alternating right handedness and left handedness may be manufactured. As a further alternative, the first and second die means may have right and left hand glove dies in side-by-side relation, with wide plastic sheeting 48, 50 having right and left hand gloves formed together in side-by-side relation. A reduction of scrap material may be achieved in this manner.

It is generally preferred to fluff the thermoplastic sheets used in this invention by crumbling, crushing, or vigorous washing to cause some dislodgement and separation of fibrous thermoplastic material in the sheet, such fibrous material being preferred for use in this invention. Such a fluffing step can cause improved heat sealability of the plastic sheets together along the desired seal lines. Additionally, the sheet material may be washed in an automatic washing machine to remove sizing materials and the like, while at the same time a fluffing effect can be achieved by the same step.

The above has been offered for illustrative purposes only, and is not intended to limit the scope of the invention of this application, which is as defined in the claims below.

That which is claimed is:

1. Apparatus for manufacturing gloves, which comprises:
process line means, and means for passing a pair of thermoplastic sheets along said process line in adjacent, facing relation; means for pushing a portion of one of said sheets outwardly to form an outwardly projecting loop defining adjacent sides and an outer end; first die means for forming a thumb-shaped thermobonded line between adjacent sides of said loop; second die means, positioned along said process line downstream of the first die means, for forming a thermobonded line of the shape of fingers and hand between said thermoplastic sheets, in registry with said thumbshaped line, while retaining an open wrist portion; and cutting means positioned on said process line downstream from the second die means for cutting away the resultant glove from the remainder of the thermoplastic sheets at said wrist portion.

2. The apparatus of claim 1 in which said first die means opens and closes in a longitudinal direction relative to the direction of said process line, while said second die means opens and closes in the direction perpendicular to the plane of said process line.

3. The apparatus of claim 1 in which second die means forms a thermobonded line defining finger portions which are in diverging relation to each other.

4. The apparatus of claim 1 in which first die means also forms added thermobonded lines extending from ends of the thumb-shaped thermobonded line, said added thermobonded lines being formed essentially perpendicular to said motion along the process line and positioned adjacent to the junction of the outwardly projecting loop and the remaining portion of said one thermoplastic sheet.

5. The apparatus of claim 1 in which first and second dies collectively form a peripherally sealed glove in pairs of thermoplastic sheets in which the axis of the glove formed from said sheets defines an angle of 30° to 60° to said motion along said process line.

6. The apparatus of claim 1 including means for punching holes in said thermoplastic sheets in predetermined spatial relation to each thumb-shaped line defined in said one thermoplastic sheet, and sensing means to position said hole upon advancement along the process line through said second die means to cause proper registry of the respective lines forming the thumb and the fingers and hand.

7. The apparatus of claim 1 including means for stripping portions of said sheet outside of the thermobonded lines, leaving the formed glove.

8. The apparatus of claim 7 in which suction port means in said first die means retains the loop in position during formation of the thumb-shaped, thermobonded line.

9. The apparatus of claim 8 in which said first die means severs away portions of said loop outside of the thumb-shaped, thermobonded line.

10. The apparatus of claim 9 including rotatable fingers carried in said first die means to brush away said severed portions from the loop after formation of the thumb-shaped, thermobonded line, and means for providing pressurized air through said suction port means to assist therein.

11. An apparatus which comprises:
process line means, and means for passing a pair of thermoplastic sheets along said process line in adjacent, facing relation; means for pushing a portion of one of said sheets transversely to the plane of the sheet to form a transversely projecting loop defining adjacent sides and an outer end; first die means for forming a first, thermobonded line between adjacent sides of said loop; second die means, positioned along said process line downstream of the first die means, for forming a second thermobonded line between said thermoplastic sheets, in registry with said first line; and cutting means positioned on said process line downstream from the second die means for cutting away the resultant product from the remainder of the thermoplastic sheets.

* * * * *